(12) United States Patent
Kizaki et al.

(10) Patent No.: US 7,515,293 B2
(45) Date of Patent: Apr. 7, 2009

(54) IMAGE FORMING APPARATUS AND METHOD OF ACQUIRING MEMORY AREA

(75) Inventors: Osamu Kizaki, Saitama (JP); Hidenori Shindoh, Tokyo (JP); Kiyotaka Moteki, Tokyo (JP); Takao Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 994 days.

(21) Appl. No.: 10/692,792

(22) Filed: Oct. 27, 2003

(65) Prior Publication Data

US 2004/0136032 A1 Jul. 15, 2004

(30) Foreign Application Priority Data

| Oct. 29, 2002 | (JP) | 2002-314673 |
| Nov. 6, 2002 | (JP) | 2002-323056 |
| Oct. 15, 2003 | (JP) | 2003-355073 |

(51) Int. Cl.
   G06F 15/00 (2006.01)
(52) U.S. Cl. .................. 358/1.16; 345/537; 345/541; 345/543; 345/544; 718/104; 707/205; 711/147
(58) Field of Classification Search .............. 358/1.16; 345/537, 541, 543, 544; 718/104; 707/205; 711/147
See application file for complete search history.

(56) References Cited

U.S. PATENT DOCUMENTS

| 5,434,650 | A | | 7/1995 | Nakahara et al. |
| 5,495,560 | A | * | 2/1996 | Kumada ..................... 358/1.15 |
| 5,510,876 | A | | 4/1996 | Hayashi et al. |
| 5,583,615 | A | | 12/1996 | Hashimoto et al. |
| 5,694,201 | A | | 12/1997 | Hayashi et al. |
| 5,784,663 | A | | 7/1998 | Hayashi et al. |
| 5,812,900 | A | | 9/1998 | Hashimoto et al. |
| 5,897,236 | A | | 4/1999 | Hashimoto et al. |
| 5,915,156 | A | | 6/1999 | Kizaki et al. |
| 5,966,564 | A | | 10/1999 | Kizaki et al. |
| 5,978,561 | A | * | 11/1999 | Kimura et al. ............. 358/1.16 |
| 5,987,230 | A | * | 11/1999 | Shimizu ..................... 358/1.16 |
| 6,026,255 | A | | 2/2000 | Kizaki et al. |
| 6,052,200 | A | * | 4/2000 | Mitani ....................... 358/1.16 |
| 6,052,202 | A | * | 4/2000 | Shimizu ..................... 358/1.16 |
| 6,122,457 | A | | 9/2000 | Kizaki |

(Continued)

OTHER PUBLICATIONS

U.S. Appl. No. 09/461,738, filed Dec. 16, 1999, Motohashi et al.

(Continued)

Primary Examiner—King Y Poon
Assistant Examiner—Jacky X Zheng
(74) Attorney, Agent, or Firm—Oblon, Spivak, McClelland, Maier & Neustadt, P.C.

(57) ABSTRACT

An image forming apparatus and a method of acquiring a memory area are disclosed for preventing a problem that image data cannot be converted due to failure of memory acquisition. The image forming apparatus includes an image data conversion part, a resource management part and an image data management part. The image data conversion part has at least one conversion function to convert a format of image data. The resource management part determines a memory size required for a conversion function to convert the format of the image data. The image data management part acquires a memory area corresponding to the determined memory size.

6 Claims, 20 Drawing Sheets

U.S. PATENT DOCUMENTS

| | | | | |
|---|---|---|---|---|
| 6,208,434 | B1* | 3/2001 | Minamizawa | 358/468 |
| 6,463,445 | B1* | 10/2002 | Suzuki et al. | 707/200 |
| 6,480,295 | B1* | 11/2002 | Taoda | 358/1.16 |
| 6,490,055 | B1* | 12/2002 | Shimizu | 358/1.9 |
| 6,564,028 | B2 | 5/2003 | Kanno | |
| 6,643,473 | B2 | 11/2003 | Moteki | |
| 6,876,466 | B1* | 4/2005 | Morikawa et al. | 358/1.17 |
| 7,019,854 | B1* | 3/2006 | Sawano | 358/1.15 |
| 7,301,653 | B2* | 11/2007 | Shindoh | 358/1.13 |
| 2002/0019914 | A1* | 2/2002 | Yamashita et al. | 711/147 |
| 2004/0136032 | A1 | 7/2004 | Kizaki et al. | |
| 2004/0190037 | A1* | 9/2004 | Shindoh | 358/1.13 |
| 2004/0233466 | A1* | 11/2004 | Shindoh et al. | 358/1.13 |
| 2005/0157322 | A1* | 7/2005 | Kizaki et al. | 358/1.13 |

OTHER PUBLICATIONS

U.S. Appl. No. 09/641,915, filed Aug. 21, 2000, Kizaki et al.
U.S. Appl. No. 09/731,724. filed Dec. 8, 2000, Michiie et al.
U.S. Appl. No. 09/737,960, filed Dec. 18, 2000, Miyazaki et al.
U.S. Appl. No. 09/770,470, filed Jan. 29, 2001, Kizaki et al.
U.S. Appl. No. 09/816,220, filed Mar. 26, 2001, Kanno.
U.S. Appl. No. 09/861,718, filed May 22, 2001, Kizaki.
U.S. Appl. No. 09/964,464, filed Sep. 28, 2001, Michiie et al.
U.S. Appl. No. 10/042,147, file Jan. 11, 2002, Chikano.
U.S. Appl. No. 10/159,110, filed Jun. 3, 2002, Akiba.
U.S. Appl. No. 10/188,754, filed Jul. 5, 2002, Terai.
U.S. Appl. No. 10/183,499, filed Jun. 28, 2002, Obata et al.
U.S. Appl. No. 10/207,058, filed Jul. 30, 2002, Kizaki.
U.S. Appl. No. 10/207,125, filed Jul. 30, 2002, Kizaki.
U.S. Appl. No. 10/259,330, filed Sep. 30, 2002, Motegi.
U.S. Appl. No. 10/327,908, filed Dec. 26, 2002, Obata et al.
U.S. Appl. No. 10/355,108, filed Jan. 31, 2003, Kizaki.
U.S. Appl. No. 10/384,595, filed Mar. 11, 2003, Tsukuba et al.
U.S. Appl. No. 10/418,111, Apr. 18, 2003, Kawahara et al.
U.S. Appl. No. 10/452,295, filed Jun. 3, 2003, Kawahara et al.
U.S. Appl. No. 10/692,792, filed Oct. 27, 2003, Kizaki et al.
U.S. Appl. No. 10/928,481, filed Aug. 30, 2004, Hattori et al.

* cited by examiner

FIG.7

| 0 | 0 | 0 | 0 | 0 | 0 | 0 | 0 |

70

↑ ↑ ↑
Option Q | Option P | Basic

FIG.8A

| 0 | 0 | 0 | 0 | 0 | 0 | 0 | 1 | — 71
↑

FIG.8B

| 0 | 0 | 0 | 0 | 0 | 0 | 0 | 0 | — 72
↑

FIG.17

|  | CONNECTION STATUS | | | MEMORY SIZE |
|---|---|---|---|---|
|  | Basic | Option P | Option Q |  |
| Type A | ○ | ○ | ○ | 9M |
| Type B | ○ | ○ | × | 7M |
| Type C | ○ | × | ○ | 6M |
| Type D | ○ | × | × | 4M |
| Type E | × | × | × | 32k |

FIG.18

|  | Basic | Option P | Option Q |
|---|---|---|---|
| Format A | ○ | ○ | × |
| Format B | ○ | × | × |
| Format C | ○ | ○ | × |
| Format D | ○ | × | × |
| Format E | ○ | × | ○ |
| Format F | ○ | × | ○ |

FIG.19

| Format A | Format B | Format C | Format D | Format E |
|----------|----------|----------|----------|----------|
| 7M | 4M | 7M | 4M | 6M |

FIG.20

| Format A | Format B | Format C | Format D | Format E |
|----------|----------|----------|----------|----------|
| 32k | 64k | 128k | 64k | 32k |

FIG.24

|  | CONNECTION STATUS | | | MEMORY SIZE | MEMORY ACQUISITION RESULT |
|---|---|---|---|---|---|
|  | Basic | Option P | Option Q | | |
| Type A | ○ | ○ | ○ | 9M | × |
| Type B | ○ | ○ | × | 7M | × |
| Type C | ○ | × | ○ | 6M | ○ |
| Type D | ○ | × | × | 4M | ○ |
| Type E | × | × | × | 32k | ○ |

FIG.25

|  | Basic | Option P | Option Q | DETERMINATION RESULT |
|---|---|---|---|---|
| Format A | ○ | ○ | × | × |
| Format B | ○ | × | × | ○ |
| Format C | ○ | ○ | × | × |
| Format D | ○ | × | × | ○ |
| Format E | ○ | × | ○ | ○ |
| Format F | ○ | × | ○ | ○ |

IMAGE FORMING APPARATUS AND METHOD OF ACQUIRING MEMORY AREA

BACKGROUND OF THE INVENTION

1. Field of the Invention

The present invention generally relates to memory acquisition for conversion of image data, and more particularly to an image forming apparatus and a method of acquiring a memory area.

2. Description of the Related Art

In recent years, one type of image forming apparatus called a "multifunctional product" has been widely recognized. Such an image forming apparatus integrally accommodates various functions such as a facsimile, a printer, a copier and a scanner in one housing. In general, the multifunctional product includes not only a display part, a print part and an image forming part but also four types of applications corresponding to the facsimile, the printer, the copier and the scanner. In this configuration, the multifunctional product can work as the facsimile, the printer, the copier and the scanner by correspondingly switching these applications.

For this reason, the multifunctional product has to be able to handle various formats of image data. In general, a multifunctional product has a conversion function to convert a format of image data into another format. Also, the multifunctional product can compress and decompress image data (such compression and decompression are considered as a kind of conversion in this specification, and are collectively referred to as conversion hereinafter) for the purpose of saving hardware resources thereof.

However, such image data conversion requires a large amount of memory because the image data generally have a large data size. Accordingly, if a multifunctional product cannot reliably acquire a required amount of memory, the multifunctional product cannot convert a format of image data into another suitable format.

SUMMARY OF THE INVENTION

It is a general object of the present invention to provide an image forming apparatus and a method of acquiring a memory area in which one or more of the above-mentioned problems are eliminated.

A more specific object of the present invention is to provide an image forming apparatus and a method of acquiring a memory area that can prevent the problem that image data cannot be converted due to failure of memory acquisition.

In order to achieve the above-mentioned objects, there is provided according to one aspect of the present invention an image forming apparatus having at least one hardware item and at least one program for image formation, including: an image data conversion part having at least one conversion function to convert a format of image data; a resource management part determining a memory size required for a conversion function to convert the format of the image data; and an image data management part acquiring a memory area corresponding to the determined memory size.

In an embodiment of the present invention, the image data management part, in response to receipt of a request to convert the format of the image data from an application operating in accordance with the at least one program, may acquire the memory area.

In an embodiment of the present invention, the image data management part, in response to activation of the image forming apparatus, may acquire the memory area.

In an embodiment of the present invention, the resource management part may have convertible format information to indicate at least one format of image data that the at least one hardware item is able to convert corresponding to the memory size of the memory area acquired by the image data management part.

In an embodiment of the present invention, the image data conversion part may use a hardware item to convert the format of the image data.

In an embodiment of the present invention, the hardware item may include a basic conversion part by default, and further include at least one optional conversion part to provide an additional conversion function.

In an embodiment of the present invention, the additional conversion function of the at least one optional conversion part may be for improving an image quality of the image data.

In an embodiment of the present invention, the additional conversion function of the at least one optional conversion part may be for converting a format of image data that the basic conversion part is not able to convert.

In an embodiment of the present invention, the hardware item may have hardware information regarding the basic conversion part and the at least one optional conversion part.

In an embodiment of the present invention, the image data conversion part may include a conversion management part managing the hardware item.

In an embodiment of the present invention, the conversion management part may have device management information regarding the basic conversion part and the at least one optional conversion part.

In an embodiment of the present invention, the conversion management part may report the device management information to the resource management part.

In an embodiment of the present invention, the resource management part may have resource management information regarding the basic conversion part and the at least one optional conversion part, and the resource management information may be obtained based on the reported device management information.

In an embodiment of the present invention, the resource management part may have target memory size information to indicate a relation between combinations of the basic conversion part and the at least one optional conversion part and memory sizes of memory areas required to convert a format of image data by the combinations.

In an embodiment of the present invention, the resource management part may have combination information to indicate a relation between formats of image data and combinations of the basic conversion part and the at least one optional conversion part necessary to convert the formats.

In an embodiment of the present invention, the resource management part may determine a target memory size based on the resource management information, the target memory size information, the combination information and a converted format.

In an embodiment of the present invention, the resource management part, when the image data management part fails to acquire a memory area corresponding to the determined target memory size, may determine a new target memory size based on the target memory size information.

In an embodiment of the present invention, the resource management part, when the image data management part fails to acquire a memory area corresponding to the determined target memory size, may determine a new target memory size through gradual size decreases from the determined target memory size based on the resource management information.

In an embodiment of the present invention, the determined target memory size may be gradually decreased based on a memory size required for each of the at least one optional conversion part.

In an embodiment of the present invention, the resource management part, when the image data management part fails to acquire a memory area of the determined target memory size, may determine a new target memory size through gradual size increases from a memory size required for the basic conversion part.

In an embodiment of the present invention, the memory size required for the basic conversion part may be gradually increased based on a memory size required for each of the at least one optional conversion part.

In an embodiment of the present invention, the resource management part may determine the target memory size such that said target memory size is greater than or equal to a memory size obtained based on the resource management information and the target memory size information.

In an embodiment of the present invention, the resource management part, when the image data management part fails to acquire a memory area required for the hardware item, may determine the target memory size as a memory size required for a software item of the image data conversion part to convert the format of the image data.

Additionally, there is provided according to another aspect of the present invention a method of acquiring a memory area for an image forming apparatus having at least one hardware item for image formation, at least one application operating in accordance with at least one program for image formation, and an image data conversion part having at least one conversion function to convert a format of image data, the method including: a size determination step of determining, in response to receipt of a request to convert a format of image data from an application of the image forming apparatus, a target memory size required to convert the format of the image data based on a conversion function of the image data conversion part corresponding to the image data and the converted format; a memory area acquisition step of acquiring a memory area corresponding to the determined target memory size; and a memory area release step of releasing the acquired memory area after the format of the image data is converted.

In an embodiment of the present invention, the memory area acquisition step, when the memory area acquisition step fails to acquire the memory area corresponding to the determined target memory size, may acquire a memory area to convert the format of the image data through gradual size decreases from the determined target memory size.

Additionally, there is provided according to another aspect of the present invention a method of acquiring a memory area for an image forming apparatus having at least one hardware item for image formation, at least one program for image formation, and an image data conversion part having at least one conversion function to convert a format of image data, the method including: a size determination step of determining, in response to activation of the image forming apparatus, a target memory size required for a conversion function of the image data conversion part; and a memory area acquisition step of acquiring a memory area corresponding to the determined target memory size and the conversion function.

In an embodiment of the present invention, the memory area acquisition step, when the memory area acquisition step fails to acquire the memory area corresponding to the determined target memory size, may acquire a memory area to convert the format of the image data through gradual size increases from a memory size smaller than the determined target memory size.

According to one aspect of the present invention, it is possible to prevent the problem that image data cannot be converted due to failure of memory acquisition.

Other objects, features and advantages of the present invention will become more apparent from the following detailed description when read in conjunction with the accompanying drawings.

BRIEF DESCRIPTION OF THE DRAWINGS

FIG. 7 is a diagram illustrating an exemplary conversion device management flag according to the embodiment;

FIGS. 8A and 8B are diagrams illustrating exemplary conversion device management flags to explain availability of Basic to MLB according to the embodiment;

FIG. 17 is a diagram illustrating an exemplary table to represent memory sizes required for format conversion according to the embodiment;

FIG. 18 is a diagram illustrating an exemplary table to represent convertible formats according to the embodiment;

FIG. 19 is a diagram illustrating an exemplary table to represent memory sizes required for individual formats according to the embodiment;

FIG. 20 is a diagram illustrating an exemplary table to represent memory sizes required for format conversion using conversion libraries according to the embodiment;

FIG. 24 is a diagram illustrating an exemplary table to represent a memory acquisition result according to the embodiment; and FIG. 25 is a diagram illustrating an exemplary table to represent a conversion determination result according to the embodiment.

DETAILED DESCRIPTION OF THE PREFERRED EMBODIMENTS

In the following, embodiments of the present invention will be described with reference to the accompanying drawings.

Figure 1:
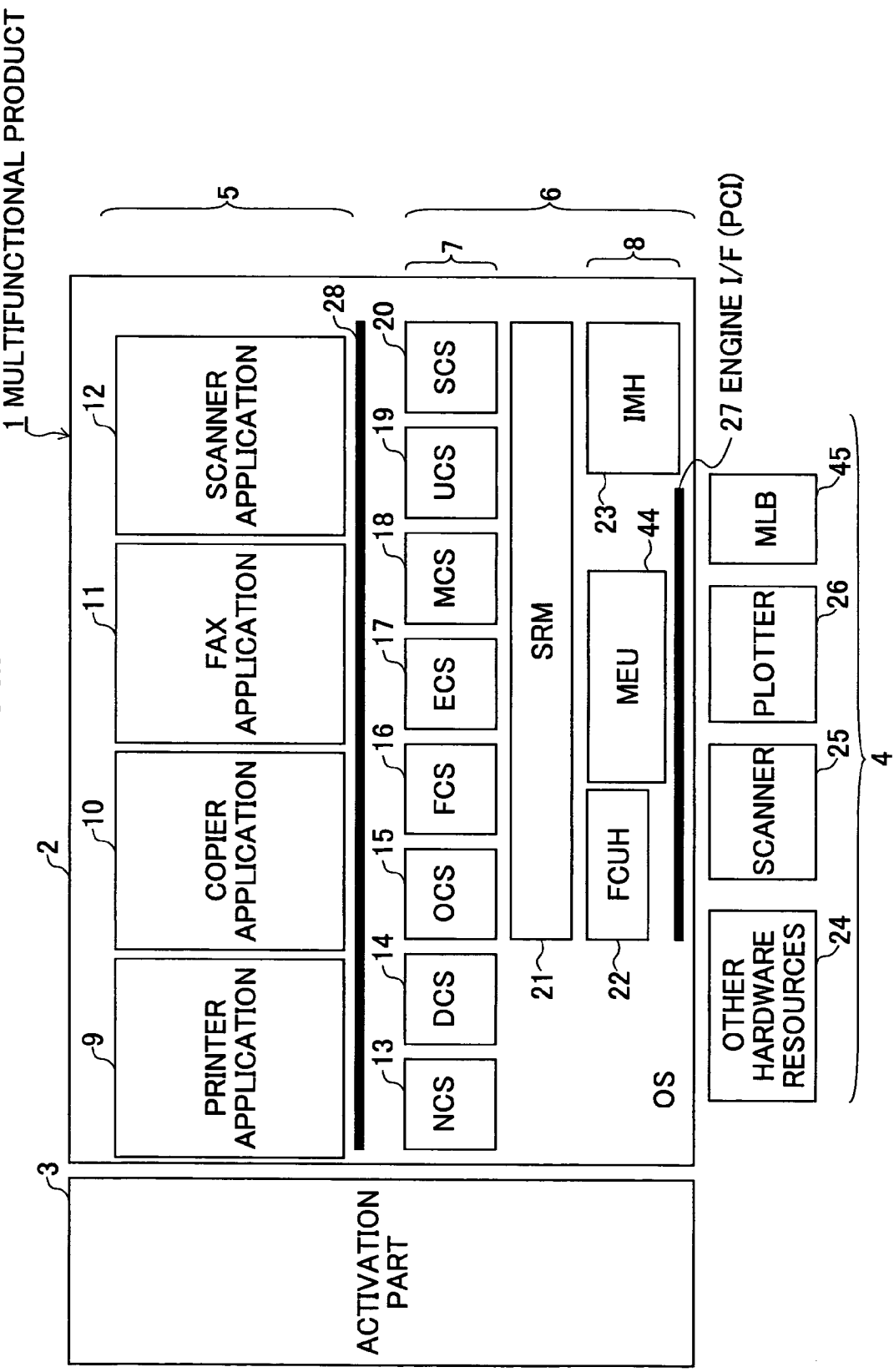
FIG. 1 is a block diagram illustrating an exemplary functional structure of a multifunctional product according to an embodiment of the present invention.

A description is given, with reference to FIG. 1, of a functional structure of a multifunctional product according to the present invention.

FIG. 1 is a block diagram illustrating a functional structure of a multifunctional product 1 according to an embodiment of the present invention.

Referring to FIG. 1, the multifunctional product 1 comprises a software set 2, an activation part 3 and hardware resources 4.

When the multifunctional product 1 is powered ON, the activation part 3 first activates an application layer 5 and a platform layer 6. For example, the activation part 3 loads programs of the application layer 5 and the platform layer 6 from a hard disk device (HDD) or the like. Then, the activation part 3 loads the programs in a memory area of the multifunctional product 1, and starts the programs. The hardware resources 4 comprises a scanner 25, a plotter 26, MLB (Media Link Board) 45 and other hardware resources 24 such as ADF (Auto Document Feeder). Here, MLB 45 is a hardware item to convert a format of image data into another format at a high speed.

The software set 2 comprises the application layer 5 and the platform layer 6, which are driven in an operating system (OS) such as UNIX (registered trademark). The application layer 5 includes programs to execute various user-service processes associated with image formation using a printer function, a copier function, a FAX function and a scanner function of the multifunctional product 1.

The application layer 5 comprises a printer application 9 for the printer function, a copier application 10 for the copier function, a FAX application 11 for the FAX function, and a scanner application 12 for the scanner function.

On the other hand, the platform layer 6 comprises a control service layer 7, a system resource manager (SRM) 21 and a handler layer 8. The control service layer 7 interprets a process request received from the application layer 5, and issues an acquisition request to acquire a hardware item of the hardware resources 4 corresponding to the process request. The system resource manager 21 arranges acquisition requests from the control service layer 7 under management of individual hardware items of the hardware resources 4. The handler layer 8 manages the hardware resources 4 base on an acquisition request from SRM 21. In the multifunctional product 1, SRM 21 corresponds to a resource management part of the inventive image forming apparatus.

The control service layer 7 comprises one or more service modules: for example, a network control service (NCS) 13, a delivery control service (DCS) 14, an operation panel control service (OCS) 15, a FAX control service (FCS) 16, an engine control service (ECS) 17, a memory control service (MCS) 18, a user information control service (UCS) 19 and a system control service (SCS) 20.

In accordance with predefined functions, the platform layer 6 is configured to have API (Application Program Interface) 28 via which the platform layer 6 can receive process requests from the application layer 5. Also, the operating system executes individual software items of the application layer 5 and the platform layer 6 as separate processes in parallel.

NCS 13, which corresponds to a communication part, provides a service commonly available to applications requiring a network I/O. Specifically, NCS 13 receives data from a network side in accordance with a protocol, and distributes the data to the applications. Also, NCS 13 plays a data intermediary role between the applications and the network side.

For example, NCS 13 controls data communication between the multifunctional product 1 and network devices connected via a network by using httpd (HyperText Transfer Protocol Daemon) in accordance with HTTP (HyperText Transfer Protocol).

DCS 14 controls delivery of documents stored in the multifunctional product 1. OCS 15 controls an operation panel, which serves as an information transmission part between the multifunctional product 1 and an operator thereof, of the multifunctional product 1. FCS 16 provides APIs for FAX transmission from the application layer 5 via PSTN (Public Service Telephone Network) or ISDN (Integrated Service Digital Network), registration and citation of various FAX data managed in a backup memory, reading of FAX data, and printing of received FAX data.

ECS 17 controls engine parts of the scanner 25, the plotter 26 and the other hardware resources 24. MCS 18 controls memory operations such as memory acquisition, memory release and HDD utilization. UCS 19 manages user information.

SCS 20 performs various system control processes, for example, an application management process, an operation part control process, a system screen control process, a LED display process, a hardware management process, and an interrupt application control process.

SRM 21 together with SCS 20 controls the multifunctional product 1 and manages the hardware resources 4. For example, SRM 21 arbitrates and controls execution of individual hardware items of the hardware resources 4 such as the scanner 25 and the plotter 26 in accordance with acquisition requests from the upper layer of the hardware resources 4.

Specifically, SRM 21 determines whether or not a requested hardware item of the hardware resources 4 is currently available, that is, whether or not the requested hardware item is being used for another acquisition request. If the hardware item is currently available, SRM 21 informs the upper layer that the requested hardware item is currently available. In addition, SRM 21, in response to receipt of an acquisition request from the upper layer, schedules individual hardware items of the hardware resources 4, and directly performs operations such as paper feeding using a printer engine, image formation using the printer engine, memory reservation and file creation in accordance with the request contents.

The handler layer 8 comprises a FAX control unit handler (FCUH) 22, an image handler (IMH) 23 and a media edit unit (MEU) 44. FCUH 22 manages a FAX control unit (FCU). IMH 23 allocates memory areas to individual processes and manages the allocated memory areas. SRM 21 and FCUH 22 send process requests to the hardware resources 4 via an engine I/F 27 in accordance with a predefined function. MEU 44 uses MLB 45 to convert image data. It is noted that MEU 44 corresponds to an image data conversion part of the inventive image forming apparatus. Alternatively, MEU 44 may use a software item rather than MLB 45 to convert a format of image data. Also, when MEU 44 receives a conversion request from an application via SRM 21 and IMH 23, MEU 44 may convert image data.

In this configuration, the multifunctional product 1 can perform processes commonly necessary for individual applications on the platform layer 6.

Figure 2:
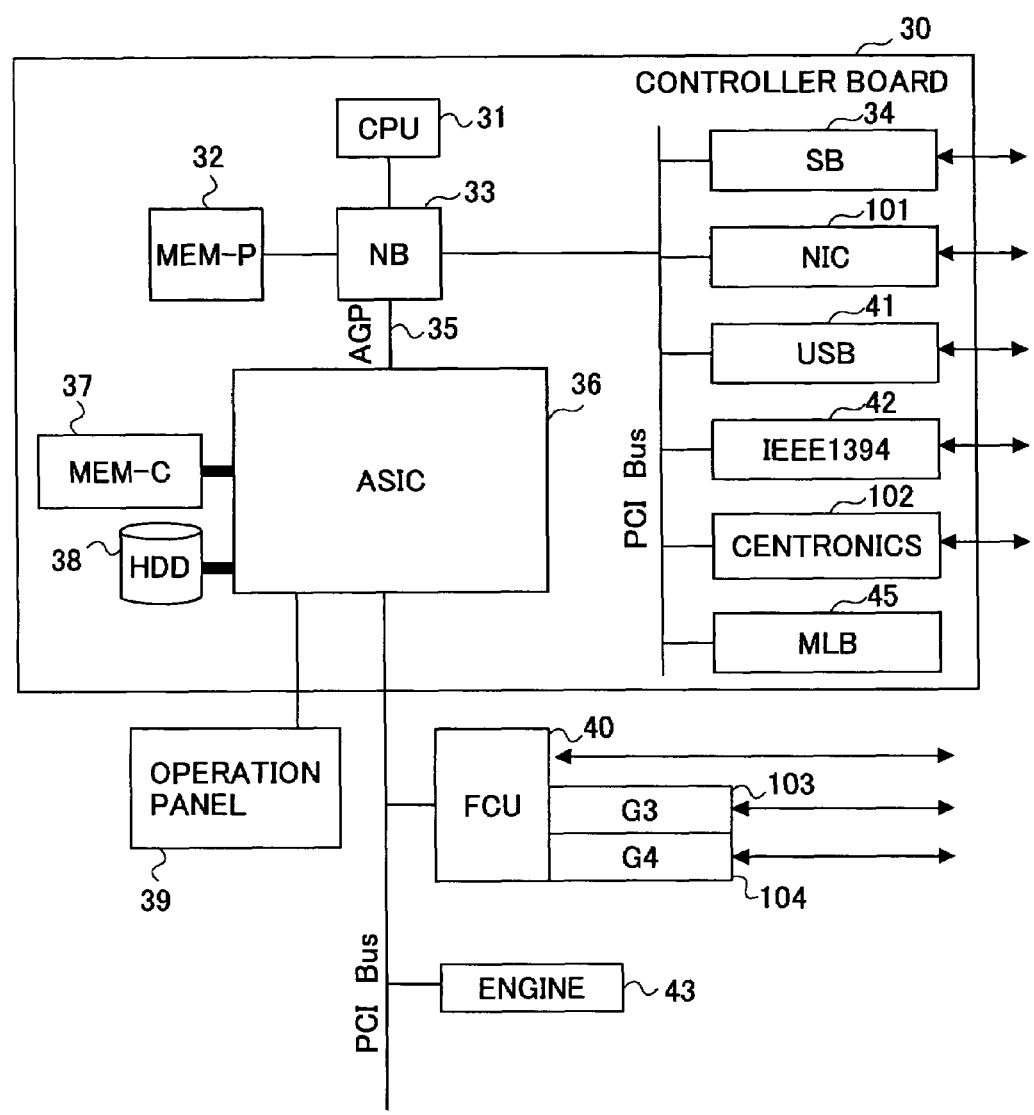
FIG. 2 is a block diagram illustrating an exemplary hardware configuration of the multifunctional product according to the embodiment.

A description is given, with reference to FIG. 2, of a hardware configuration of the multifunctional product 1 according to the embodiment.

FIG. 2 is a block diagram illustrating an exemplary hardware configuration of the multifunctional product 1 according to the embodiment.

Referring to FIG. 2, the multifunctional product 1 comprises a controller board 30, an operation panel 39, FCU 40 and an engine 43. FCU 40 has a G3 standard unit 103 and a G4 standard unit 104.

The controller board 30 comprises CPU (Central Processing Unit) 31, ASIC (Application Specific Integrated Circuit) 36, HDD 38, a system memory (MEM-P) 32, a local memory (MEM-C) 37, NB (north bridge) 33, SB (south bridge) 34, NIC (Network Interface Card) 101, a USB (Universal Serial Bus) device 41, an IEEE1394 device 42, a centronics device 102 and MLB 45.

The operation panel 39 is connected to ASIC 36 of the controller board 30. Also, SB 34, NIC 101, the USB device 41, the IEEE1394 device 42, the centronics device 102 and MLB 45 are connected to NB 33 via a PCI (Peripheral Component Interconnect) bus.

MLB 45 is configured as a substrate connected to the multifunctional product 1 via the PCI bus. In response to receipt of image data from the multifunctional product 1, MLB 45 converts the format of the image data into another data format or another encoding format, and returns the converted image data or the encoded image data to the multifunctional product 1.

Also, FCU 40 and the engine 43 are connected to ASIC 36 of the controller board 30 via another PCI bus as illustrated in FIG. 2.

Here, ASIC 36 is connected to the local memory 37 and HDD 38 accommodated in the controller board 30. In addition, CPU 31 is connected to ASIC 36 via NB 33. If CPU 31 is connected to ASIC 36 via NB 33 as illustrated in FIG. 2, it is possible to address a case where the interface of CPU 31 is not disclosed.

As shown in FIG. 2, ASIC 36 is connected to NB 33 via AGP (Accelerated Graphics Port) 67 rather than a PCI bus. In order to control execution of at least one process of the application layer 5 and the platform layer 6, ASIC 36 is connected to NB 33 via high-speed AGP 35 rather than such a low-speed PCI bus. As a result, it is possible to prevent performance degradation of the multifunctional product 1.

CPU 31 is responsible to exercise overall control over the multifunctional product 1. CPU 31 starts and executes NCS 13, DCS 14, OCS 15, FCS 16, ECS 17, MCS 18, UCS 19, SCS 20, SRM 21, FCUH 22, IMH 23 and MEU 44 as individual processes on the operating system. At the same time, CPU 31 starts and executes the printer application 4, the copier application 10, the FAX application 11 and the scanner application 12 of the application layer 5.

NB 33 is a bridge to connect CPU 31, the system memory 32, SB 34 and ASIC 36 each other. The system memory 32 is used as a graphics memory of the multifunctional product 1.

SB 34 is a bridge to connect NB 33 to the PCI bus and the peripheral devices. The local memory 37 is used as a copying image buffer and a coding buffer.

ASIC 36 is a hardware item for image processing and is an IC dedicated to image processing. HDD 38 is used as a storage device to accommodate images, programs, font data and form data. The operation panel 39 serves as an operation part to accept user's input manipulation and displays information to the user.

Figure 3:
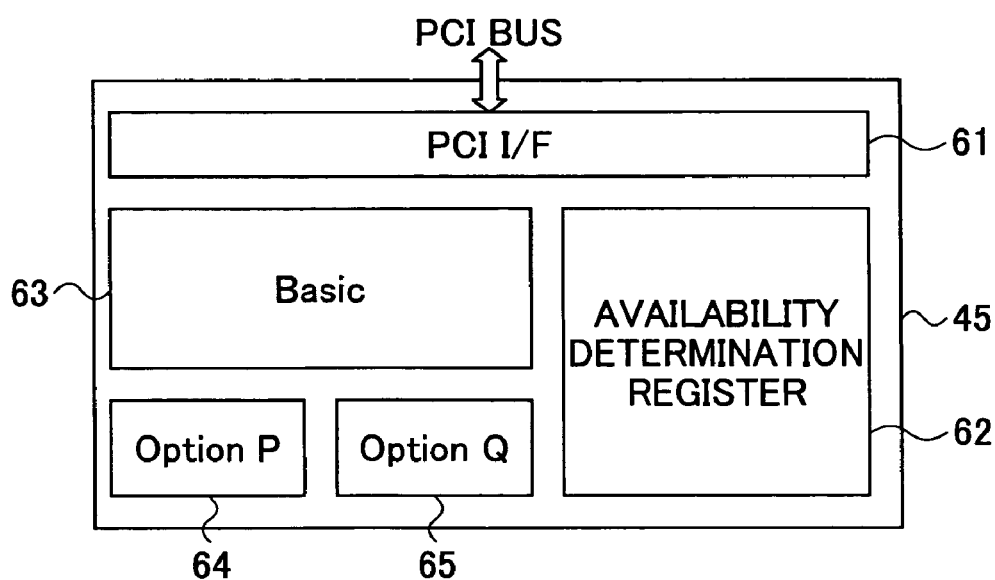
FIG. 3 is a block diagram illustrating an exemplary internal structure of MLB according to the embodiment.

A description is given, with reference to FIG. 3, of MLB 45 of the multifunctional product 1 according to the embodiment. As mentioned above, MLB 45 is a hardware item to convert a format of image data into another format.

FIG. 3 is a block diagram illustrating an exemplary internal structure of MLB 45 according to the embodiment.

Referring to FIG. 3, MLB 45 comprises a PCI I/F 61, Basic 63, Option P 64, Option Q 65 and a membership determination register 62.

The PCI interface 61 is an interface to connect MLB 45 to the PCI bus. Basic 63 is a basic conversion part that is mounted to MLB 45 by default. Basic 63 can convert image data into various known image data formats such as a binary (2-value) format, a 4-value format, an 8-value format, MH/MR/MMR, JPEG, RGB/sRGB, NFC1 and TIFF. It is noted that NFC1 is one of compression formats. It will be understood that these formats are known to those skilled in the art.

Option P 64 and Option Q 65 are additional conversion parts to provide additional conversion functions. Option P 64 has a conversion function, which is called Ri10, to improve the image quality of image data. On the other hand, Option Q 65 has a conversion function, which is called Ri2000, to convert JPEG2000 format that Basic 63 does not cover. Although FIG. 3 shows only these two options, MLB 45 may include more or less other options.

The membership determination register 62, which corresponds to hardware information of the hardware item MLB 45, represents MLB information regarding Basic 63 and options including Option P 64 and Option Q 65. Specifically, the membership determination register 62 indicates whether or not MLB 45 includes each of Basic 63 and the options.

Figure 4:
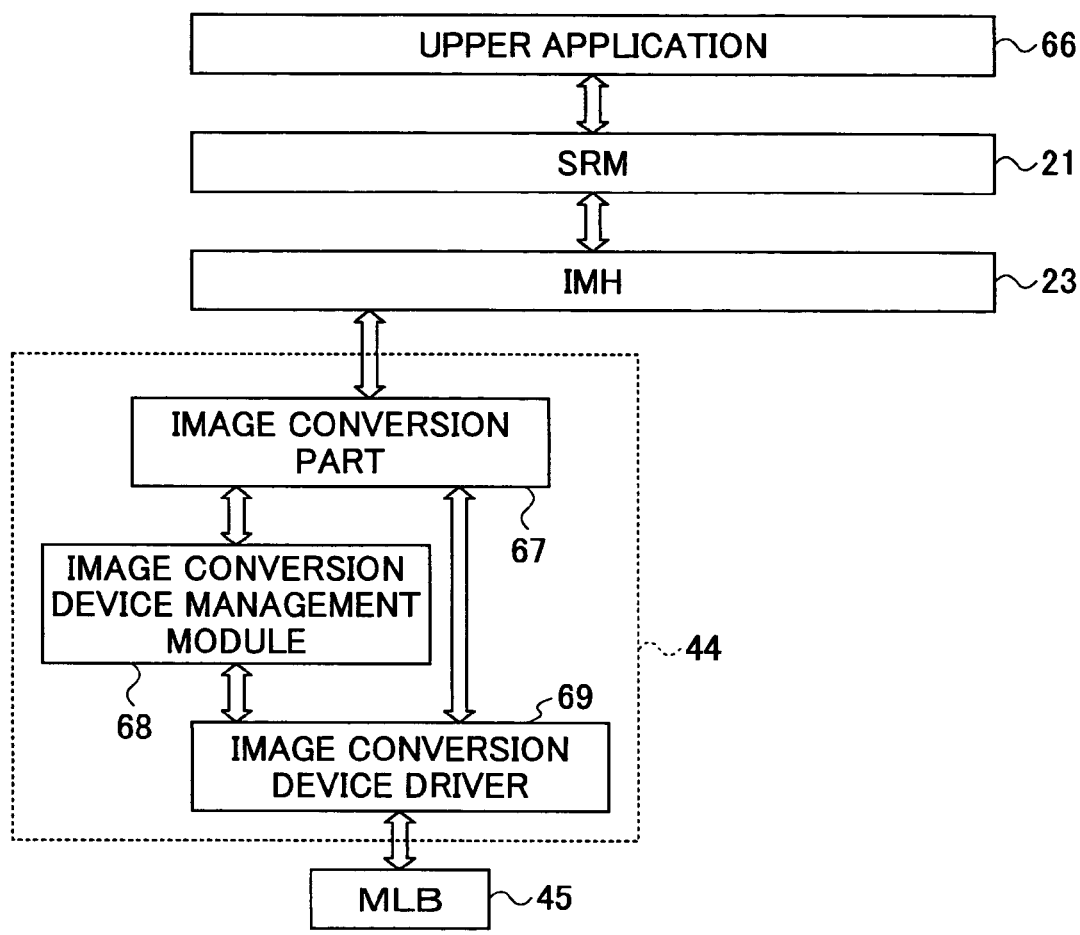
FIG. 4 is a block diagram illustrating exemplary software items of the multifunctional product associated with format conversion of image data according to the embodiment.

A description is given, with reference to FIG. 4, of a functional structure associated with format conversion of image data according to the embodiment.

FIG. 4 is a block diagram illustrating exemplary software items of the multifunctional product 1 associated with format conversion of image data according to the embodiment.

Referring to FIG. 4, an upper application 66, SRM 21, IMH 23, an image conversion part 67, an image conversion device management module 68, which corresponds to a image data management part of the inventive image forming apparatus, an image conversion device driver 69 and MLB 45 are illustrated as such software items.

The printer application 9, the copier application 10, the FAX application 11 and the scanner application 12 shown in FIG. 1 are collectively referred to as the upper application 66. SRM 21 issues to IMH 23 a config request to inform IMH 23 of a conversion request received from an application. The config request is a request including information to indicate that the conversion is for converting a certain format into another certain format.

IMH 23 acquires a memory area to be used for the format conversion of image data, and requests MEU 44 to convert the format of the image data into another format. When IMH 23 acquires the memory area, IMH 23 requests MEU 44 to convert the image data stored in the memory area.

The image conversion part 67 uses MLB 45 or a conversion library, which is a collection of software items for format conversion, to convert the format of the image data. The image data conversion device management module 68 comprises the conversion library and a plurality of functions to operate the image conversion device driver 69. The image conversion device driver 69 controls MLB 45.

Figure 5:
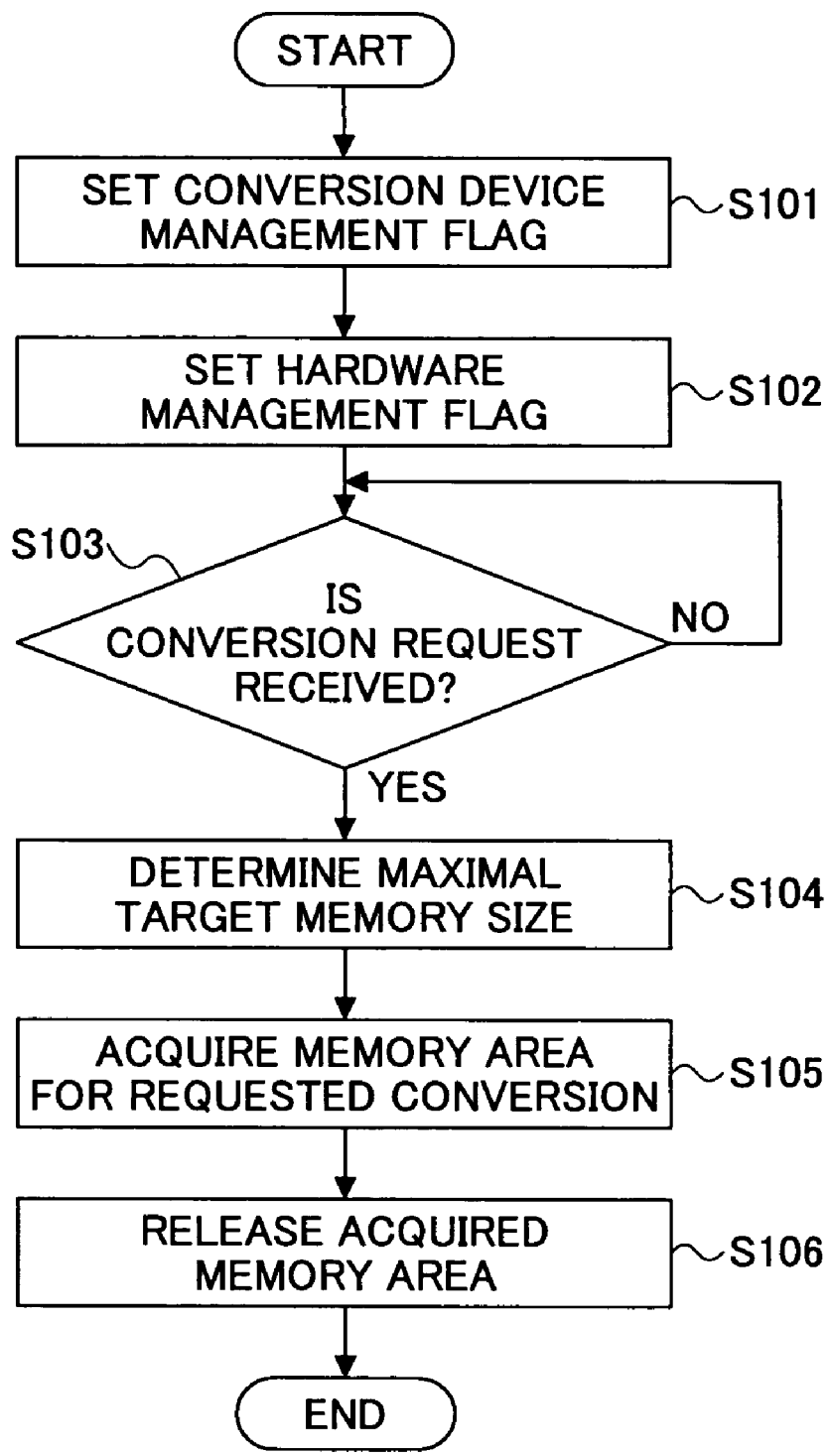
FIG. 5 is an overall flowchart of an exemplary format conversion procedure executed by the multifunctional product according to the embodiment.
Figure 6:
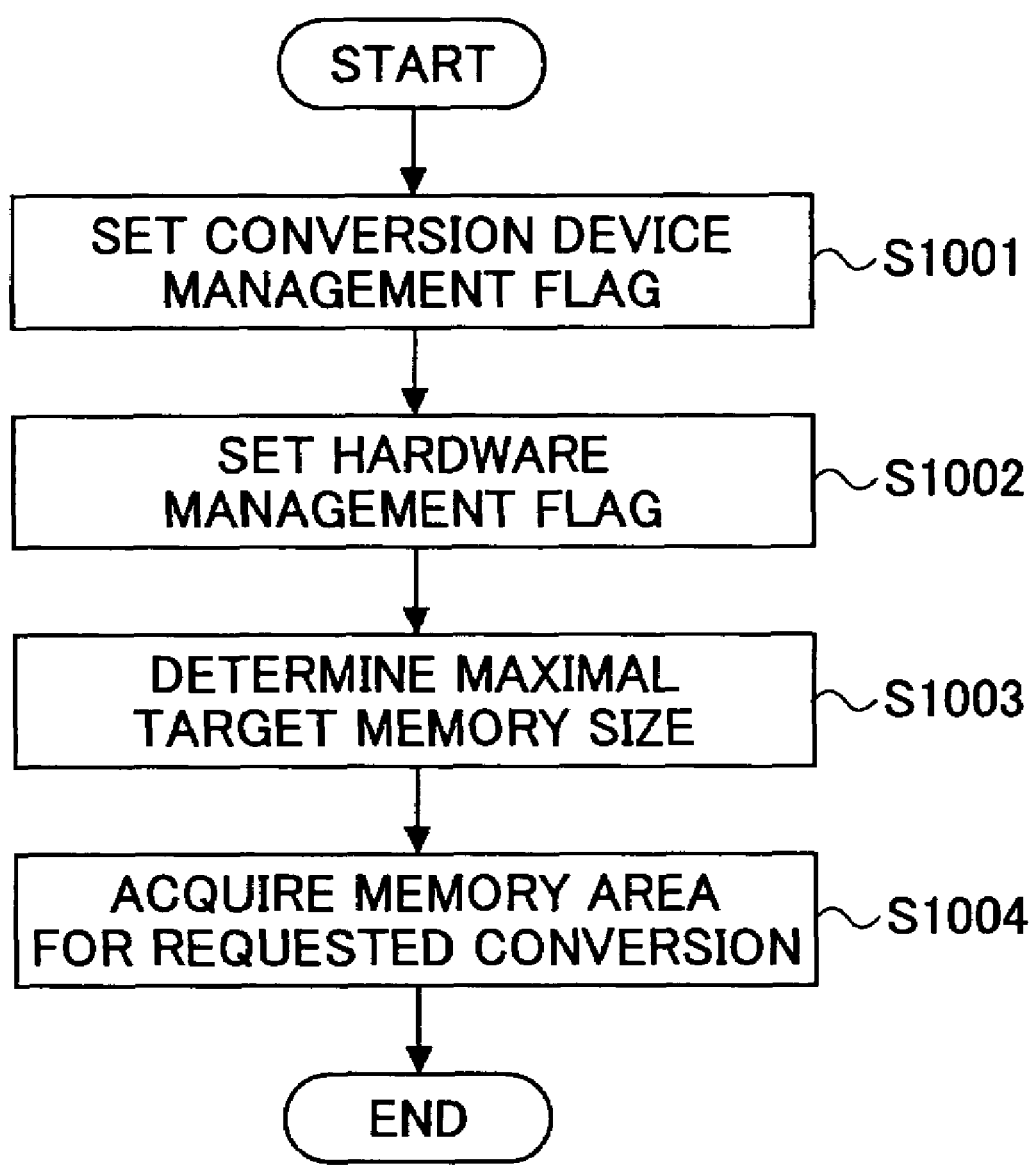
FIG. 6 is an overall flowchart of another exemplary format conversion procedure executed by the multifunctional product according to the embodiment.

A description is given, with reference to FIG. 5 and FIG. 6, of an outline of two types of exemplary format conversion procedures executed by the multifunctional product 1 according to the embodiment.

FIG. 5 is an overall flowchart of an exemplary format conversion procedure executed by the multifunctional product 1 in a case where the multifunctional product 1 acquires a memory area in response to receipt of a conversion request. On the other hand, FIG. 6 is an overall flowchart of another exemplary format conversion procedure executed by the multifunctional product 1 in a case where the multifunctional product 1 acquires a memory area in response to activation of the multifunctional product 1.

First, the format conversion procedure in the case where the multifunctional product 1 acquires a memory area in response to receipt of a conversion request is explained with reference to FIG. 5.

Referring to FIG. 5, steps S101 and S102 are executed at start time of the multifunctional product 1. When an application of the multifunctional product 1 issues a conversion request, steps S103 through S106 are executed to determine a memory size required for the requested conversion and acquire a memory area corresponding to the memory size. It is noted that the requesting application is not limited to the printer application 9, the copier application 10, the FAX application 11 and the scanner application 12. The application may include additional programs that can be executed in the application layer 5 and various service modules of the control service layer 7.

At step S101, the image conversion device management module 68 sets a conversion device management flag. It is noted that the conversion device management flag corresponds to device management information of the inventive image forming apparatus.

At step S102, SRM 21 sets a hardware management flag based on the conversion device management flag. It is noted that the hardware management flag corresponds to resource management information.

As mentioned above, steps S101 and S102 are executed when the multifunctional product 1 is activated. However, if information set in the conversion device management flag and the hardware management flag may be changed after the activation of the multifunctional product 1, these steps may be executed not only at the activation time but also according to need.

At step S103, SRM 21 checks whether or not the upper application 66 has requested format conversion of image data.

If SRM 21 receives a conversion request from the upper application 66, SRM 21 determines a maximal target memory size at step S104. It is noted that step S104 corresponds to a size determination step of the inventive method of acquiring a memory area. Then, SRM 21 requests IMH 23 to acquire a memory area having the determined memory size.

At step S105, IMH 23 acquires the memory area having the determined memory size. It is noted that step S105 corresponds to a storage area acquisition step of the inventive method of acquiring a memory area. Then, IMH 23 requests MEU 44 to convert the image data stored in the memory area.

After the format conversion, IMH 23 releases the acquired memory area at step S106. It is noted that step S106 corresponds to a storage area release step of the inventive method of acquiring a memory area. Then, the format conversion procedure is terminated.

Next, the other format conversion procedure in the case where the multifunctional product 1 acquires a memory area in response to activation of the multifunctional product 1 is explained with reference to FIG. 6.

Referring to FIG. 6, the image conversion device management module 68 sets the conversion device management flag at step S1001.

At step S1002, SRM 21 sets the hardware management flag.

At step S1003, SRM 21 determines a maximal target memory size.

At step S1004, IMH 23 acquires a memory area having the determined memory size.

A description is given, with reference to FIG. 7 through FIG. 11, of the conversion device management flag according to the embodiment.

The conversion device management flag, which is possessed by the image conversion device management module 68, is used to retain information based on the membership determination register 62 of MLB 45.

FIG. 7 shows an exemplary conversion device management flag according to the embodiment.

Referring to FIG. 7, a bit sequence 70, which serves as a conversion device management flag, is configured as a sequence of 8 bits. As shown in FIG. 7, the lowest three bits of the bit sequence 70 are assigned to Basic, Option P and Option Q. Each of the bits represents membership of the corresponding item to MLB 45.

FIGS. 8A and 8B show exemplary conversion device management flags to explain membership of Basic to MLB 45.

Referring to FIGS. 8A and 8B, the membership of Basic is represented in the lowest bit of bit sequences 71 and 72. If Basic is included in MLB 45, the lowest bit of the conversion device management flag is set as 1 as illustrated in the bit sequence 71 in FIG. 8A. On the other hand, if Basic is not included in MLB 45, the lowest bit of the conversion device management flag is set as 0 as illustrated in the bit sequence 72 in FIG. 8B.

Figure 9A:
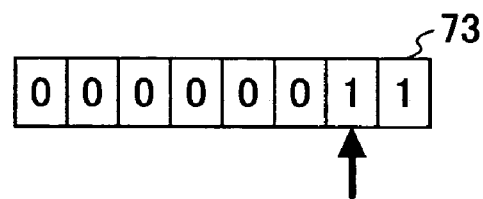
FIGS. 9A and 9B are diagrams illustrating exemplary conversion device management flags to explain availability of Option P to MLB according to the embodiment.
Figure 9B:
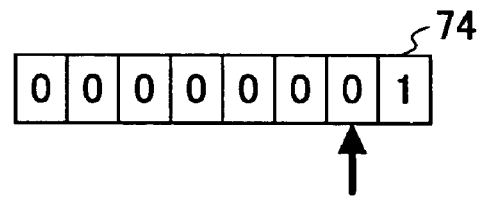

FIGS. 9A and 9B show exemplary conversion device management flags to explain membership of Option P to MLB 45.

Referring to FIGS. 9A and 9B, the membership of the option P is represented in the second lowest bit of the bit sequences 73 and 74. If Option P is included in MLB 45, the second lowest bit of the conversion device management flag is set as 1 as illustrated in the bit sequence 73 in FIG. 9A. On the other hand, if Option P is not included in MLB 45, the second lowest bit of the conversion device management flag is set as 0 as illustrated in the bit sequence 74 in FIG. 9B.

Figure 10A:
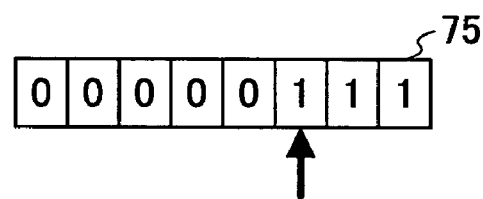
FIGS. 10A and 10B are diagrams illustrating exemplary conversion device management flags to explain availability of Option Q to MLB according to the embodiment.
Figure 10B:
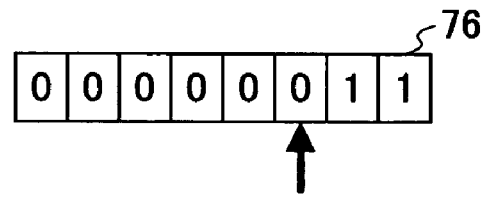

FIGS. 10A and 10B show exemplary conversion device management flags to explain membership of Option Q to MLB 45.

Referring to FIGS. 10A and 10B, the membership of Option P is represented in the third lowest bit of the bit sequences 75 and 76. If Option Q is included in MLB 45, the third lowest bit of the conversion device management flag is set as 1 as illustrated in the bit sequence 75 in FIG. 10A. On the other hand, if the option Q is not included in MLB 45, the third lowest bit of the conversion device management flag is set as 0 as illustrated in the bit sequence 76 in FIG. 10B.

In this embodiment, the three bits are used to indicate membership of Basic and the two options to MLB 45. However, the conversion device management flag according to the present invention is not limited to these three bits. Depending on the number of available options, the number of bits to indicate membership are made variable.

Figure 11:
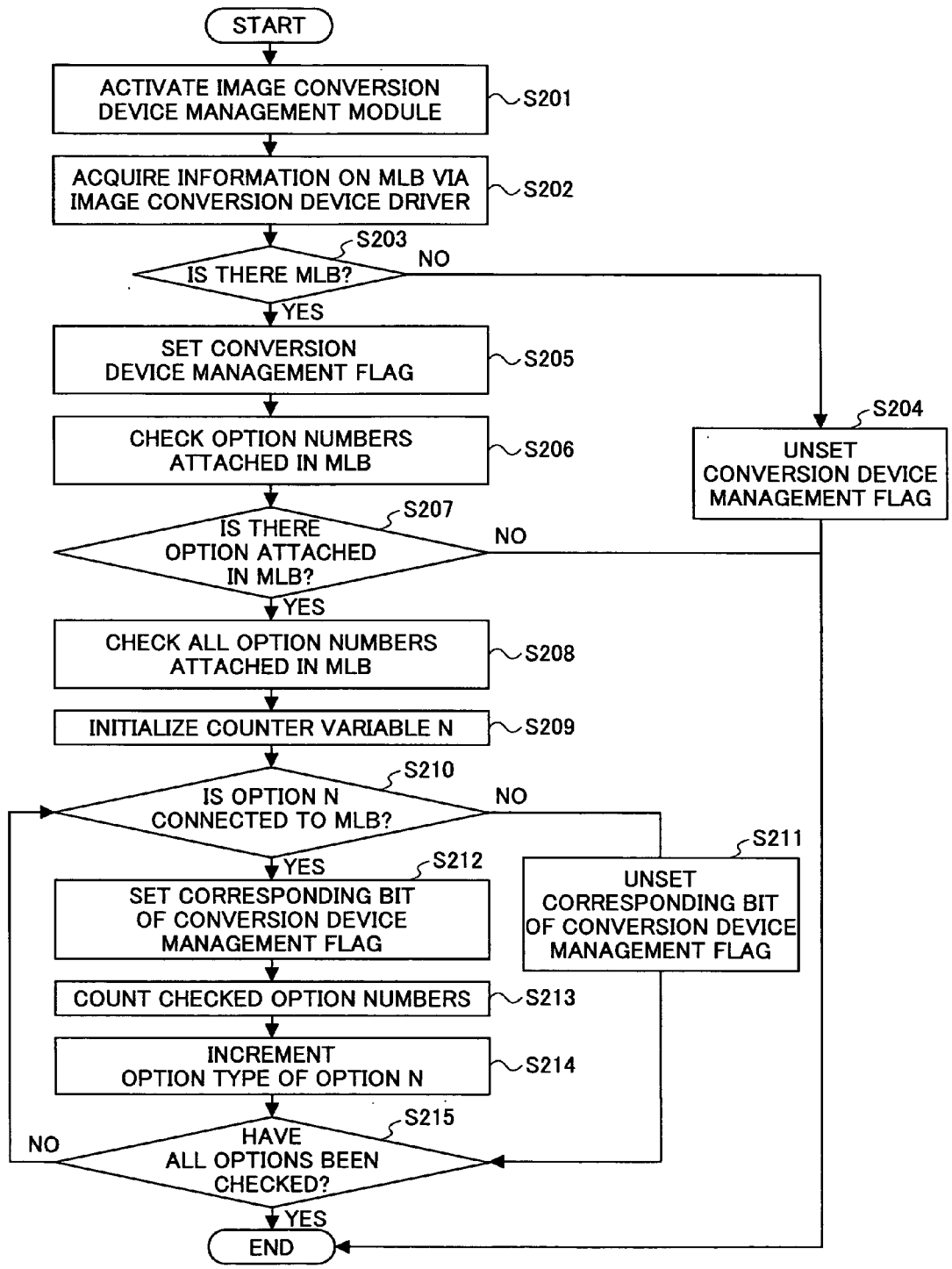
FIG. 11 is a flowchart of an exemplary procedure to set a conversion device management flag according to the embodiment.

FIG. 11 is a flowchart of an exemplary procedure to set the conversion device management flag according to the embodiment. It is noted that this flowchart shows step S101 in FIG. 5 and step S1001 in FIG. 6 in detail.

Referring to FIG. 11, the image conversion device management module 68 is activated at step S201.

At step S202, the image conversion device management module 68 acquires information regarding MLB 45 through the image conversion device driver 69.

At step S203, the image conversion device management module 68 determines whether or not the multifunctional product 1 has MLB 45 based on the acquired information regarding MLB 45. If the multifunctional product 1 does not have MLB 45, the image conversion device management module 68 terminates the procedure to set the conversion device management flag without setting the conversion device management flag at step S204. On the other hand, if the multifunctional product 1 has MLB 45, the image conversion device management module 68 sets the conversion device management flag of MLB 45 at step S205.

At step S206, the image conversion device management module 68 checks option numbers attached in MLB 45.

At step S207, the image conversion device management module 68 determines whether or not there is an option attached in MLB 45. If there is no option, the image conversion device management module 68 terminates the procedure to set the conversion device management flag. On the other hand, if there is some option attached to MLB 45, the image conversion device management module 68 checks all option numbers attached in MLB 45 at step S208.

At step S209, the image conversion device management module 68 initializes a counter variable N for option checking. The counter N is used as a loop counter for the subsequent loop steps S210 through S215.

At step S210, the image conversion device management module 68 determines whether or not the option N is connected. The option N represents the number assigned to each option in advance. For example, Option P is set as the option 1, and Option Q is set as the option 2.

If the option N is not connected, the image conversion device management module 68 proceeds to step S215 without setting the corresponding bit of the conversion device management flag. On the other hand, if the option n is connected, the image conversion device management module 68 sets the corresponding bit of the conversion device management flag at step S212.

At step S213, the image conversion device management module 68 counts the number of checked option numbers attached in MLB 45. In this step, option numbers checked so far are simply summed.

At step S214, the image conversion device management module 68 increments the option type of the option N. For example, the computation result may demonstrate that MLB 45 has three Options P and two Options Q.

At step S215, the image conversion device management module 68 determines whether or not all options have been checked.

If all the options have been checked, the image conversion device management module 68 terminates the process to set the conversion device management flag. On the other hand, if all the options have not been checked, the image conversion device management module 68 returns to step S210.

In this fashion, the multifunctional product 1 executes steps S101 in FIG. 5 and S1001 in FIG. 6 to set the conversion device management flag.

A description is given, with reference to FIG. 12 through FIG. 16, of a hardware management flag according to the embodiment.

Figure 12:
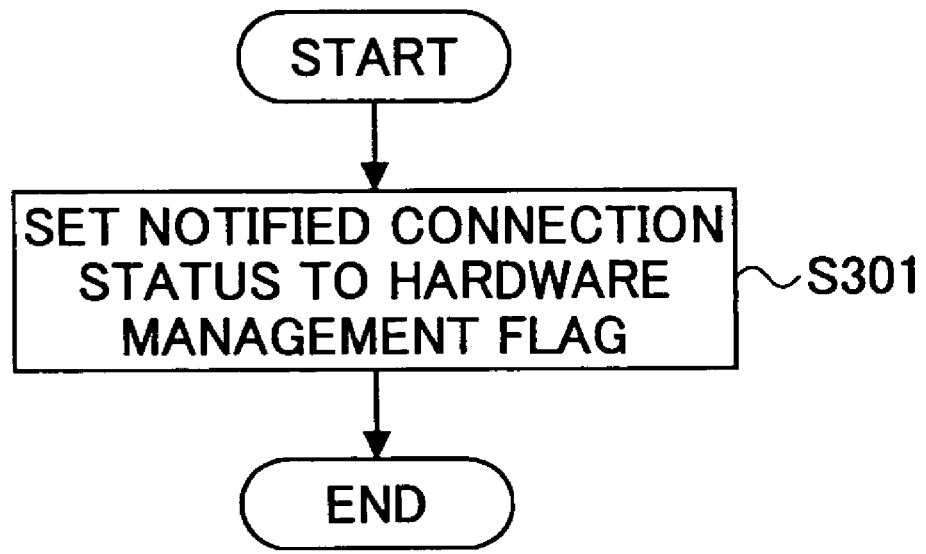
FIG. 12 is a flowchart of an exemplary procedure to set a hardware management flag according to the embodiment.

FIG. 12 is a flowchart of an exemplary procedure to set the hardware management flag according to the embodiment. It is noted that the flowchart shows step S102 in FIG. 5 and step S1002 in FIG. 6 in detail.

Referring to FIG. 12, SRM 21 sets a connection status of each option, which is notified from the image conversion device management module 68, to the hardware management flag.

Figure 13:
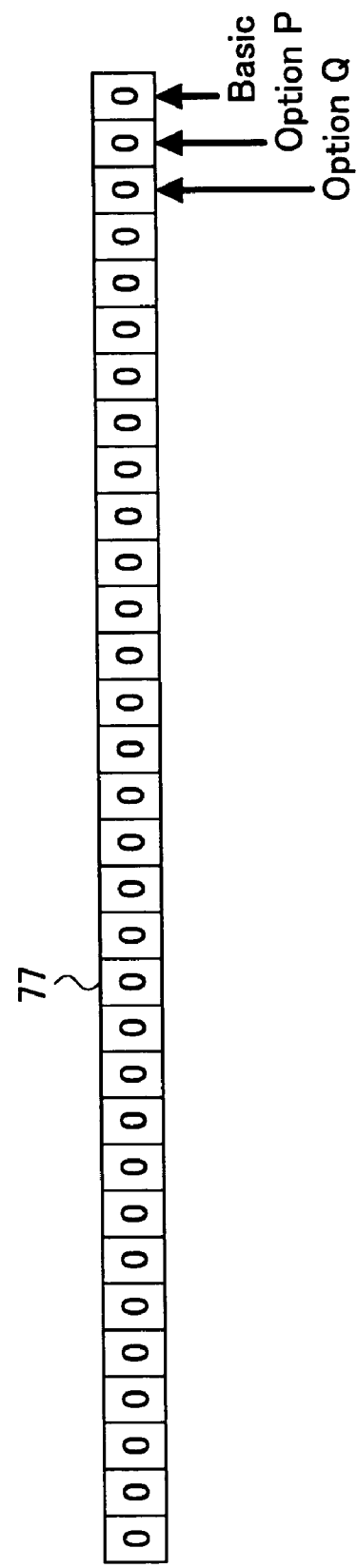
FIG. 13 is a diagram illustrating an exemplary hardware management flag according to the embodiment.

FIG. 13 shows an exemplary hardware management flag according to the embodiment.

Referring to FIG. 13, a bit sequence 77, which serves as a hardware management flag, is configured as a sequence of 32 bits. As shown in FIG. 13, the lowest three bits of the bit sequence 77 are assigned to Basic, Option P and Option Q. Each of the bits represents membership of the corresponding item to MLB 45.

The hardware management flag has the greater length of the bit sequence than the conversion device management flag does, because SRM 21 manages hardware resources other than MLB 45.

Figure 14A:
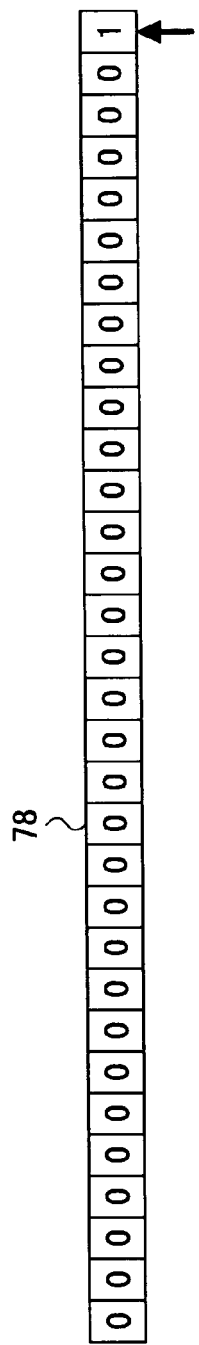
FIGS. 14A and 14B are diagrams illustrating exemplary hardware management flags to explain availability of Basic to MLB according to the embodiment.
Figure 14B:
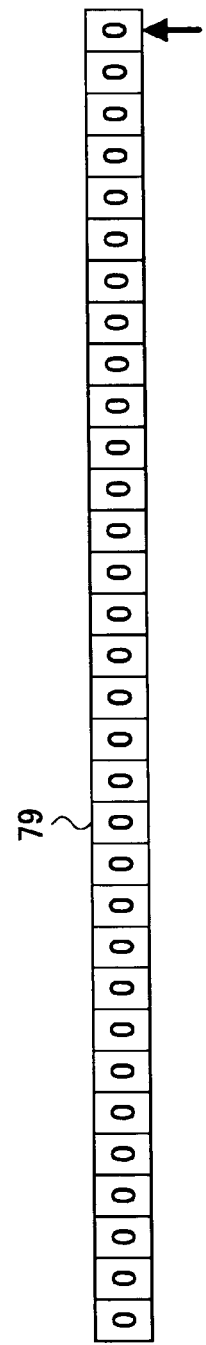

FIGS. 14A and 14B show exemplary hardware management flags to explain membership of Basic to MLB 45.

Referring to FIGS. 14A and 14B, the membership of Basic to MLB 45 is represented in the lowest bit of bit sequences 78 and 79. If Basic is included in MLB 45, the lowest bit of the hardware management flag is set as 1 as illustrated in the bit sequence 78 in FIG. 14A. On the other hand, if Basic is not included in MLB 45, the lowest bit of the hardware management flag is set as 0 as illustrated in the bit sequence 79 in FIG. 14B.

Figures 15A, 15B:
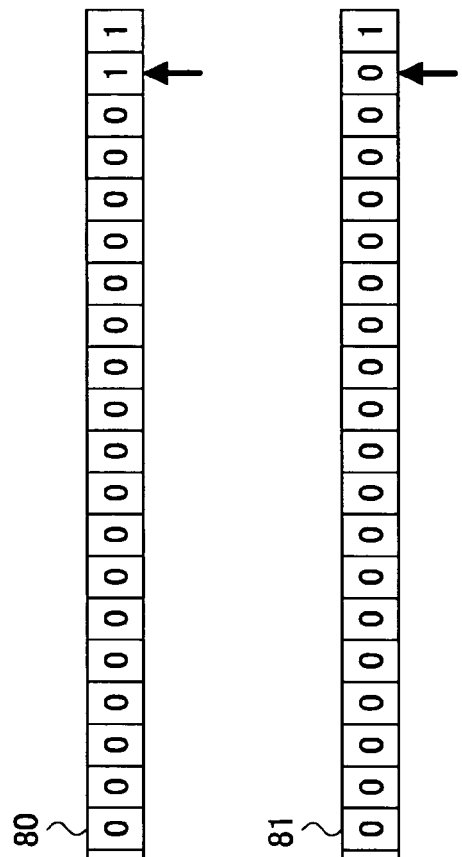
FIGS. 15A and 15B are diagrams illustrating exemplary hardware management flags to explain availability of Option P to MLB according to the embodiment.

FIGS. 15A and 15B show exemplary hardware management flags to explain membership of Option P to MLB 45.

Referring to FIGS. 15A and 15B, the membership of Option P to MLB 45 is represented in the second lowest bit of the bit sequences 80 and 81. If Option P is included in MLB 45, the second lowest bit of the hardware management flag is set as 1 as illustrated in the bit sequence 80 in FIG. 15A. On the other hand, if Option P is not included in MLB 45, the second lowest bit of the hardware management flag is set as 0 as illustrated in the bit sequence 81 in FIG. 15B.

Figure 16A:
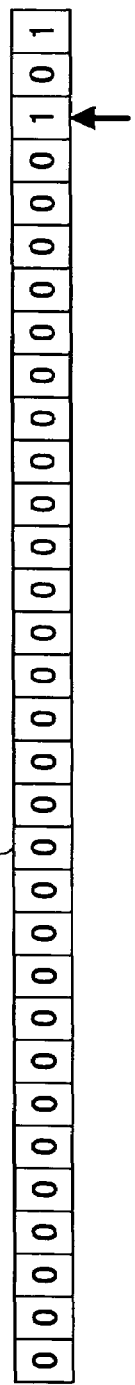
FIGS. 16A and 16B are diagrams illustrating exemplary hardware management flags to explain availability of Option Q to MLB according to the embodiment.
Figure 16B:
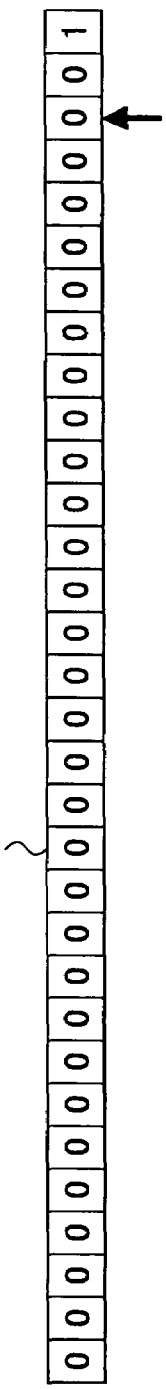

FIGS. 16A and 16B show exemplary hardware management flags to explain membership of Option Q to MLB 45.

Referring to FIGS. 16A and 16B, the membership of Option P to MLB 45 is represented in the third lowest bit of the bit sequences 82 and 83. If Option Q is included in MLB 45, the third lowest bit of the hardware management flag is set as 1 as illustrated in the bit sequence 82 in FIG. 16A. On the other hand, if Option Q is not included in MLB 45, the third lowest bit of the hardware management flag is set as 0 as illustrated in the bit sequence 83 in FIG. 16B.

In this fashion, SRM 21 has a hardware management flag based on a conversion device management flag. Also, the hardware management flag includes information regarding Basic and options of MLB 45.

A description is given, with reference to FIG. 17 through FIG. 25, of memory area acquisition according to the embodiment.

SRM 21 determines a memory size based on the hardware management flag, information sets shown in FIG. 17 and FIG. 18, and conversion formats.

FIG. 17 shows an exemplary table to represent memory sizes required for format conversion using various combinations of Basic, Option P and Option Q. The table is exemplary memory size information to represent a relation between combinations of Basic, Options P and Option Q available for the format conversion and memory sizes required for the format conversion by means of the individual combinations.

According to this table, Type A, which includes all of Basic, Option P and Option Q, requires 9 MB (megabyte) as the memory size to be acquired. Also, Type C, which includes Basic and Option Q, requires 6 MB as the memory size to be acquired.

As inferred from this observation, Basic, Option P and Option Q require 4 MB, 3 MB and 2 MB, respectively.

It is noted that Type E corresponds to a case where none of Basic, Option P and Option Q is available. In this case, the above-mentioned conversion library is used to convert image data. Accordingly, a relatively smaller memory size is prepared for Type E than any other types. As shown in FIG. 17, 32 KB is prepared for Type E in this embodiment. However, the memory size is not limited to 32 KB. The memory size may be a memory size other than 32 KB.

FIG. 18 shows an exemplary table to represent formats of image data which individual combinations of Basic, Option P and Option Q can convert.

Referring to FIG. 18, Format A can be converted by means of a combination of Basic and Option P. Format B can be converted by means of only Basic.

A memory size required for each format is determined based on FIG. 17 and FIG. 18.

FIG. 19 shows an exemplary table to represent memory sizes required for individual formats.

Referring to FIG. 19, conversion of Format A requires 7 MB, because Format A can be converted by means of a combination of Basic (4 MB) and Option P (3 MB).

FIG. 20 shows an exemplary table to represent memory sizes required for format conversion using conversion libraries.

Referring to FIG. 20, a memory area of 32 KB is required for format conversion of Format A and Format E by means of a conversion library. A memory area of 64 KB is required for format conversion of Format B and Format D by means of a conversion library. A memory area 128 KB is required for format conversion of Format C by means of a conversion library.

Figure 21:
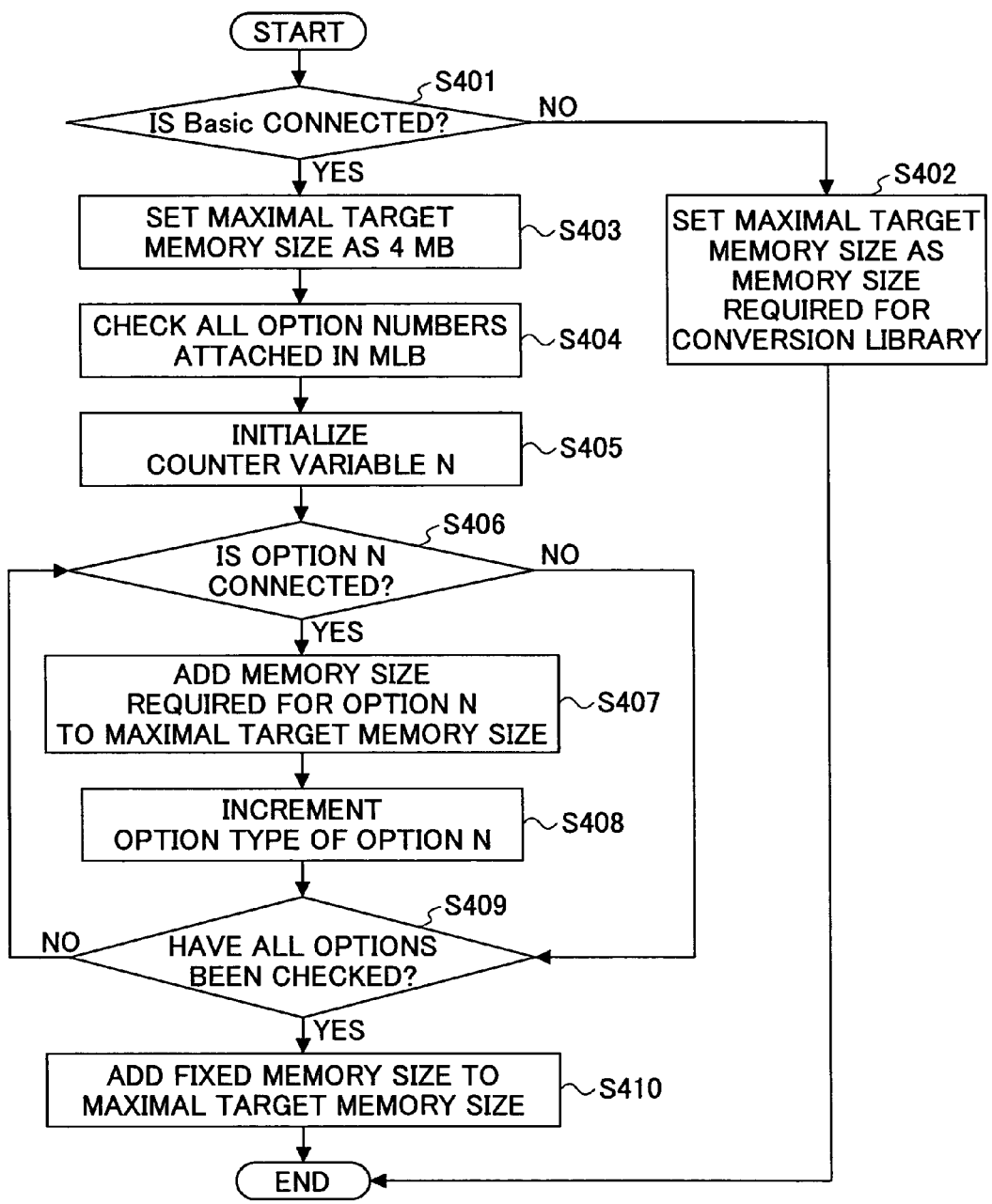
FIG. 21 is a flowchart of an exemplary procedure to determine a maximal target memory size to be acquired according to the embodiment.

FIG. 21 is a flowchart of an exemplary procedure to determine a maximal target memory size to be acquired according to the embodiment. This procedure corresponds to step S104 in FIG. 5 and step S1003 in FIG. 6.

Referring to FIG. 21, SRM 21 determines whether or not Basic is connected at step S401.

If Basic is not connected, SRM 21 determines the maximal target memory size to be acquired as a memory size required for the conversion library at step S402, and terminates the procedure.

On the other hand, if Basic is connected, SRM 21 sets the maximal target memory size as 4 MB at step S403.

At step S404, SRM 21 checks all option numbers attached in MLB 45.

At step S405, SRM 21 initializes a counter variable N. The counter variable N is used as a loop counter of the subsequent loop steps S406 through S409.

At step S406, SRM 21 determines whether or not the option N is connected. If the option N is not connected, SRM 21 proceeds to step S409. On the other hand, if the option N is connected, SRM 21 adds a memory size required for the option N to the maximal target memory size at step S407.

At step S408, SRM 21 increments the option type of the option N.

At step S409, SRM 21 determines whether or not all options have been checked. If all the options have been checked, SRM 21 adds a fixed memory size to the maximal target memory size at step S410, and terminates the procedure. On the other hand, if all the options have not been checked, SRM 21 returns to step S406.

In this fashion, SRM 21 can determine the maximal target memory size based on the hardware management flag and the acquisition size information shown in FIG. 19 and FIG. 20.

As mentioned above, the maximal target memory size is determined by computing the memory size based on the hardware management flag and the acquisition size information and then adding a fixed memory size to the memory size. This addition is intended to improve the processing speed of the format conversion by using such a greater memory size. However, the multifunctional product 1 can properly convert image data without the addition of such an extra memory size.

Figure 22:
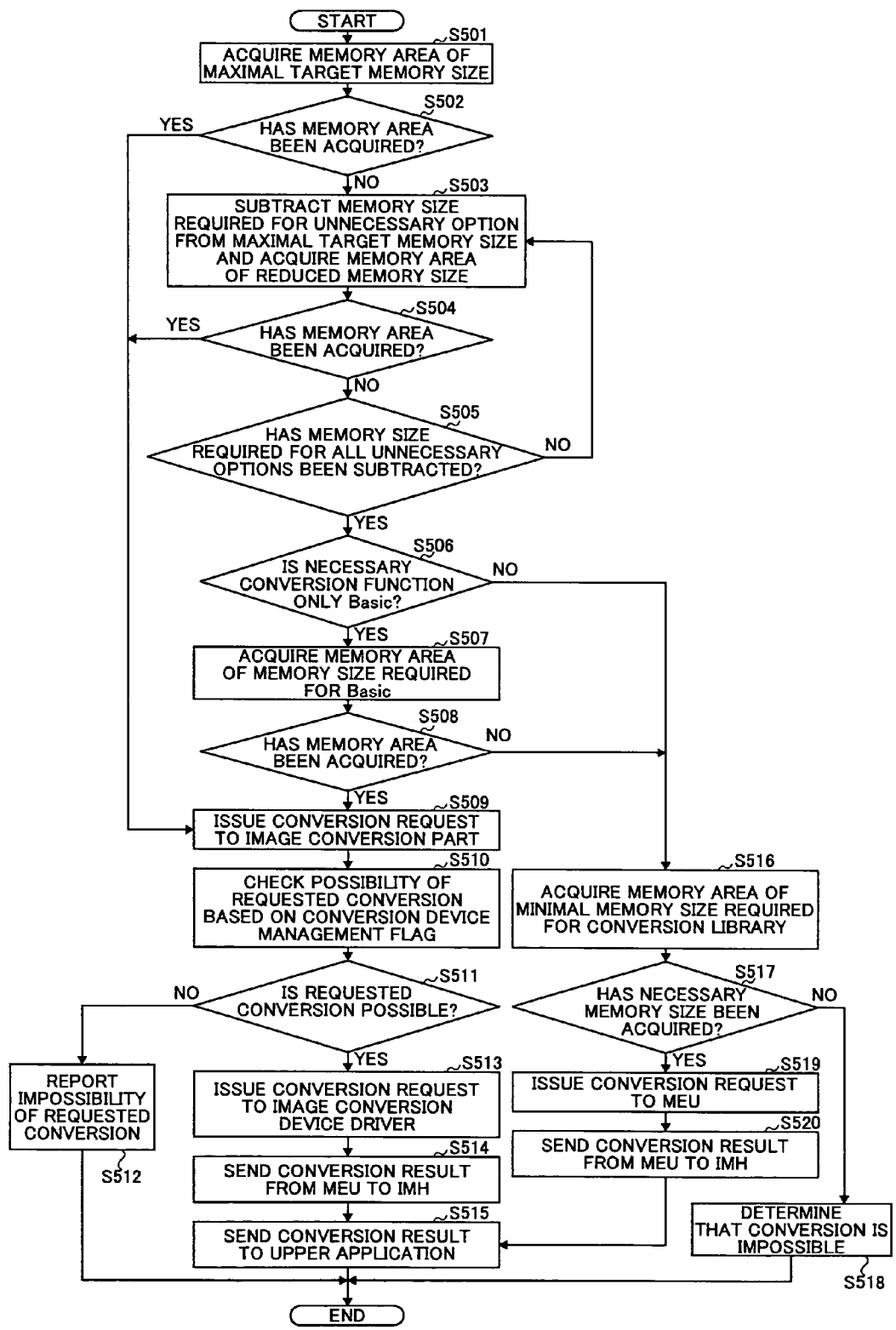
FIG. 22 is a flowchart of an exemplary procedure to acquire a memory area according to the embodiment.

FIG. 22 is a flowchart of an exemplary procedure to acquire a memory area according to the embodiment. It is noted that the flowchart demonstrates step S105 in FIG. 5 in more detail.

Referring to FIG. 22, IMH 23 attempts to acquire the maximal target memory size, which is determined in the procedure shown in FIG. 21, at step S501.

At step S502, IMH 23 determines whether or not IMH 23 has successfully acquired a memory area corresponding to the maximal target memory size. If IMH 23 has acquired the memory area, IMH 23 proceeds to step S509. On the other hand, if SRM 21 failed to acquire the memory area, SRM 21 determines an option unnecessary for a requested conversion function based on the hardware management flag, and causes IMH 23 to acquire a smaller memory area again. SRM 21 determines the memory size of the smaller memory area by subtracting a memory size required for an unnecessary option from the maximal target memory size.

At step S504, IMH 23 determines whether or not IMH 23 has successfully acquired the smaller memory area. If IMH 23 has acquired the memory area, IMH 23 proceeds to step S509. On the other hand, if IMH 23 failed to acquire the memory area, SRM 21 determines whether or not a memory size required for all unnecessary options has been subtracted from the maximal target memory size at step S505.

If the memory size required for all the unnecessary options has not been subtracted, SRM 21 returns to step S503. On the other hand, if the memory size required for all the unnecessary options has been subtracted, SRM 21 proceeds to step S506.

In this fashion, while IMH 23 fails to acquire memory areas corresponding to the determined memory sizes, SRM 21 is gradually decreasing the memory size of a memory area to be acquired. For each memory area decrease step, the decreased memory size is determined based on the memory sizes of unnecessary options.

However, the decreased memory size is not limited to the memory sizes of the unnecessary options. Alternatively, the decreased memory size may be set, for example, as 1 MB or 500 KB regardless of the memory sizes of the unnecessary options.

At step S506, SRM 21 determines whether or not the requested conversion can be executed by using only Basic. If the requested conversion cannot be executed by using only Basic, SRM 21 causes IMH 23 to acquire a memory area corresponding to a minimal memory size required for the conversion library of MEU 44 at step S516.

In this fashion, if SRM 21 cannot secure a memory size required for conversion, SRM 21 determines the memory size required for the conversion library as the target memory size.

At step S517, IMH 23 determines whether or not IMH 23 has acquired a memory area enough to implement the conversion. If IMH 23 does not have the memory area, neither MLB 45 nor the conversion library is available. Thus, IMH 23 determines that the conversion is impossible, and terminates the procedure. On the other hand, if IMH 23 has successfully acquired the memory area, IMH 23 issues a conversion request to MEU 44 at step S519.

At step S520, MEU 44 reports a result of the requested conversion to IMH 23.

At step S515, IMH 23 informs the upper application 66 of the conversion result via SRM 21 and terminates the procedure.

On the other hand, if SRM 21 determines that the conversion can be executed by using only Basic at step S506, IMH 23 attempts to acquire a memory area required for Basic at step S507.

At step S508, IMH 23 determines whether or not IMH 23 has successfully acquired the memory area. If IMH 23 failed to acquire the memory area, IMH 23 proceeds to the above-mentioned step S516. On the other hand, if IMH 23 has successfully acquired the memory area, IMH 23 issues a conversion request to the image conversion part 67 at step S509.

At step S510, the image conversion part 67 determines whether or not the requested conversion can be executed based on the conversion device management flag.

At step S511, if the image conversion part 67 determines that the conversion is impossible, the image conversion part 67 informs IMH that the conversion is impossible at step S512. On the other hand, if the image conversion part 67 determines that the conversion can be executed, the image conversion part 67 requests the image conversion device driver 69 to execute the conversion at step S513.

At step S514, MEU 44 reports a result of the conversion to IMH 23.

At step S515, IMH 23 informs the upper application 66 of the conversion result via SRM 21, and terminates the procedure.

Figure 23:
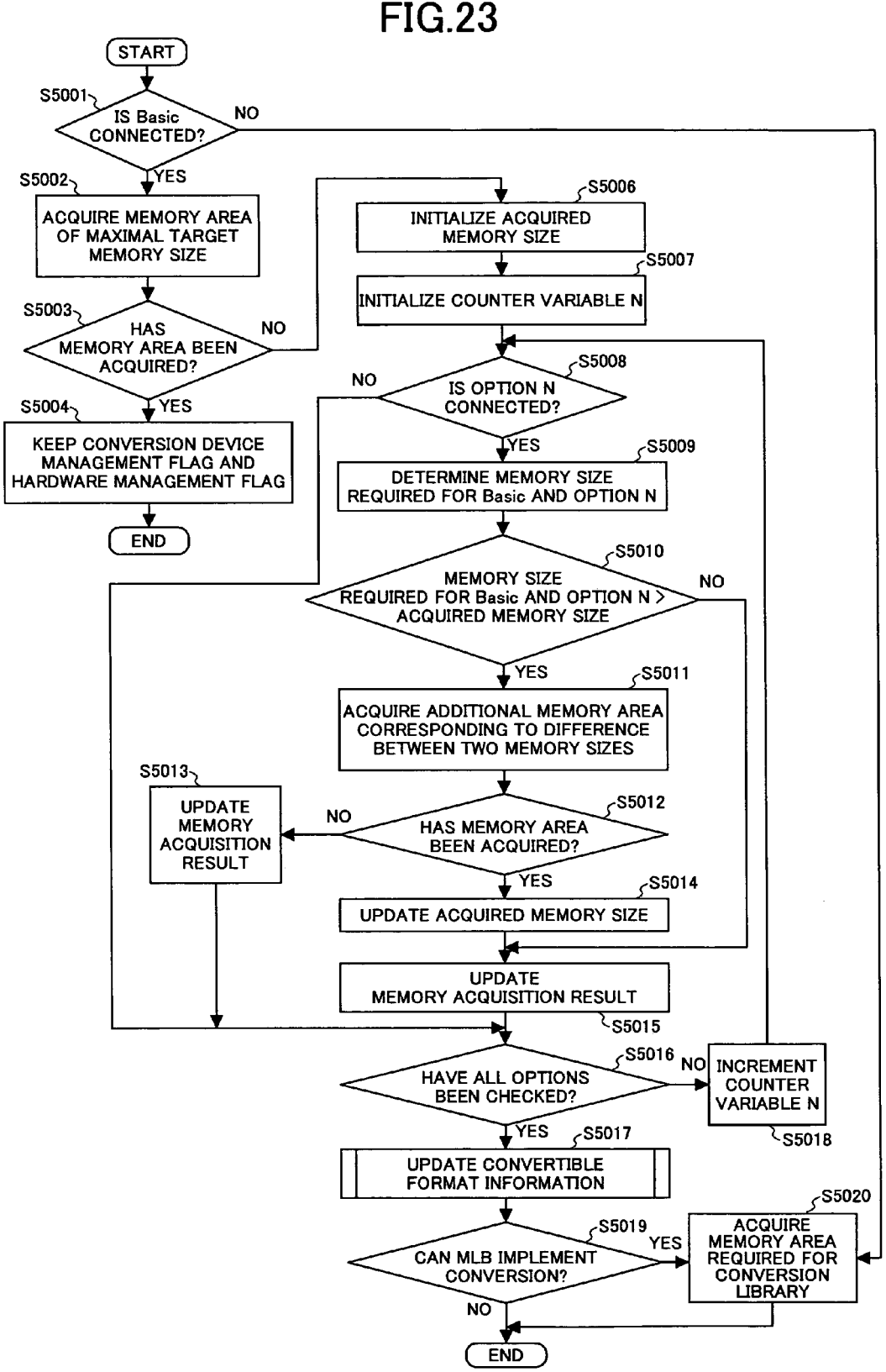
FIG. 23 is a flowchart of another exemplary procedure to acquire a memory area according to the embodiment.

FIG. 23 is a flowchart of an exemplary procedure to acquire a memory area according to the embodiment. It is noted that the flowchart demonstrates step S1004 in FIG. 6 in more detail.

Referring to FIG. 23, SRM 21 determines whether or not Basic is connected at step S5001. If Basic is not connected, SRM 21 causes IMH 23 to acquire a memory area required for the conversion library at step S5020, and terminates the procedure. On the other hand, if Basic is connected, SRM 21 causes IMH 23 to attempt to acquire a memory area corresponding to the determined maximal target memory size at step S5002.

At step S5003, SRM 21 determines whether or not IMH 23 has successfully acquired the memory area. If IMH 23 has acquired the memory area, SRM 21 terminates the procedure without changing the conversion device management flag and the hardware management flag at step S5004. On the other hand, if IMH 23 failed to acquire the memory area, SRM 21 proceeds to step S5006.

At step S5006, SRM 21 initializes an acquired memory size, that is, the memory size of a memory area that IMH 23 has acquired so far.

At step S5007, SRM 21 initializes a counter variable N to identify each option. The number N is used as a loop counter of the subsequent loop steps S5008 through S5016.

At step S5008, SRM 21 determines whether or not the option N is connected. If the option N is not connected, SRM 21 proceeds to step S5016. On the other hand, if the option N is connected, SRM 21 computes a memory size required for Basic and the option N at step S5009.

At step S5010, SRM 21 determines whether or not the computed memory size is greater than the acquired memory size. If the computed memory size required for Basic and the option N is not greater than the acquired memory size (S5010: NO), SRM 21 proceeds to step S5015. On the other hand, if the memory size required for Basic and the option N is greater than the acquired memory size, SRM 21 proceeds to step S5011 to cause IMH 23 to acquire an additional memory area.

At step S5011, IMH 23 computes a target additional memory size by subtracting the acquired memory size from the memory size required for Basic and the option N. Then, IMH 23 attempts to acquire the additional memory area corresponding to the computed target additional memory size.

In this fashion, the multifunctional product 1 can secure a memory area necessary for format conversion by gradually adding additional memory areas to acquired memory area.

As mentioned above, even if IMH 23 cannot acquire the determined maximal target memory size, IMH 23 can acquire additional memory areas based on differences between the memory size required for Basic and the option N and the acquired memory size. In other words, even if SRM 21 fails to acquire the determined maximal target memory size, IMH 23 can gradually increase the acquired memory area based on the hardware management flag.

At step S5012, SRM 21 determines whether or not IMH 23 has successfully acquired the additional memory area corresponding to the target additional memory size. If IMH 23 failed to acquire the memory area, SRM 21 updates a memory acquisition result as illustrated in FIG. 24 at step S5013.

FIG. 24 shows an exemplary table to represent such a memory acquisition result according to the embodiment.

Referring to FIG. 24, the table is configured by adding the memory acquisition result to the table shown in FIG. 17. This table offers convertible combination information to indicate what combination of Basic and options is available under the memory size acquired by IMH 23. In the illustrated table, it can be observed that IMH 23 has acquired a memory area of 6 MB at this point. Namely, IMH 23 failed to acquire a larger memory area required for Type A and Type B. Based on the table in FIG. 24, it can be determined whether or not each format of Formats A through F as shown in FIG. 18 can be converted.

FIG. 25 shows an exemplary table to represent a conversion determination result according to the embodiment.

Referring to FIG. 25, the table is configured by adding the conversion determination result to the table shown in FIG. 18. The table shows that IMH 23 failed to acquire the memory area required for Type A and Type B. Thus, Format A and Format C cannot be converted in this situation, because Format A and Format C require both of Basic and Option P for conversion. The table offers convertible format information to indicate what format MLB 45 can convert under the memory area acquired by IMH 23.

If IMH 23 has successfully acquired the additional memory area at step S5012, SRM 21 updates the acquired memory size at step S5014. The memory size required for Basic and the option N is substituted for the updated acquired memory size.

At step S5015, SRM 21 updates the memory acquisition result based on the updated acquired memory size.

At step S5016, SRM 21 determines whether or not all options have been checked. If all the options have not been checked, SRM 21 increments the counter variable N at step S5018, and returns to step S5008. On the other hand, if all the options have been checked, SRM 21 updates the table shown in FIG. 25 based on a combination of Basic and the option N at step S5017.

At step S5019, SRM 21 determines whether or not the acquired memory area is too small for MLB 45 to convert image data. If MLB 45 can properly convert image data under the acquired memory area, the procedure is terminated. On the other hand, if MLB 45 cannot properly convert image data under the acquired memory area, SRM 21 causes IMH 23 to acquire a memory area required for the conversion library, and terminates the procedure.

According to the above-mentioned multifunctional product 1, the multifunctional product 1 can efficiently acquire a memory area enough to convert image data. At the same time, for example, even if a memory portion of the multifunctional product 1 has trouble, the multifunctional product 1 can provide a conversion function corresponding to the remaining memory portion.

The present invention is not limited to the specifically disclosed embodiments, and variations and modifications may be made without departing from the scope of the present invention.

The present application is based on Japanese Patent Priority Applications No. 2002-314673 filed Oct. 29, 2002, No. 2002-323056 filed Nov. 6, 2002, and No. 2003-355073 filed Oct. 15, 2003, the entire contents of which are hereby incorporated by reference.

What is claimed is:

1. An image forming apparatus configured to be connected to a plurality of hardware resources by a system bus, including:
   an image conversion unit configured to process image data by software with a first conversion function to convert the image data into a different format, and configured to access and to send the image data to a hardware image processing unit over the system bus that is configured to process the image data with at least one second hardware conversion function;
   a resource management unit configured to determine a memory size required for one of the first conversion function or the at least one second hardware conversion function to convert the format of the image data; and
   an image data management unit acquiring a memory area in a memory corresponding to a predetermined maximal memory size,
   wherein the image conversion unit is further configured to access a register of the hardware image processing unit over the system bus to determine which ones of the at least one second hardware conversion functions are available for conversion of the image data, and
   wherein when the image data management unit fails to acquire a memory area corresponding to the predetermined maximal memory size, the image data management unit attempts to acquire a smaller memory area corresponding to a smaller memory size gradually reduced from the predetermined maximal memory size by gradually subtracting a memory size without reducing the smaller memory area below the required memory size for one of the first conversion function or the at least one second hardware conversion function.

2. The image forming apparatus according to claim 1, wherein hardware image processing units with different types of at least one second hardware conversion functions can be connected to the system bus, and the image conversion unit is configured
   to identify the different types of at least one second hardware conversion functions of the hardware image processing unit, and
   to submit image data to the different types of at least one second hardware conversion functions of the hardware image processing unit for image processing.

3. The image forming apparatus according to claim 1, further comprising the hardware image processing unit connected to the system bus, wherein the hardware image processing unit includes:
   a first hardware image processing unit configured to compress the image data;
   a second hardware image processing unit configured to improve image quality of the image data; and
   an availability determination register configured to be accessed by the system bus to indicate what second hardware conversion functions are available in the hardware image processing unit.

4. The image forming apparatus according to claim 2, wherein the resource management unit is configured to set a hardware management flag based on the identification of the different types of at least one second hardware conversion functions by the image conversion unit, and
   the resource management unit is configured to determine the memory size required for the different types of at least one second hardware conversion functions, upon a request for image data conversion from an external device.

5. A method of acquiring a memory area for an image forming apparatus configured to be connected to a plurality of hardware resources by a system bus, at least one of the hardware resources being a hardware image processing unit having at least one second hardware conversion function configured to convert a format of image data, the method comprising:
   accessing the hardware image processing unit over the system bus by an image data conversion unit to read a register of the hardware image processing unit, the register including information determining which ones of the at least one second hardware conversion functions are available for conversion of the image data;
   determining a memory size required for the at least one second hardware conversion function to convert the format of the image data; and
   acquiring a memory area in a memory corresponding to a predetermined maximal memory size,
   wherein when said acquiring fails to acquire a memory area corresponding to the predetermined maximal memory size, the acquiring further attempts to acquire a smaller memory area corresponding to a smaller memory size gradually reduced from the predetermined maximal memory size by gradually subtracting a memory size without reducing the smaller memory area below the required memory size for the at least one second hardware conversion function determined in said determining a memory size.

6. The method of acquiring a memory area for an image forming apparatus according to claim 5, further comprising:
   setting a hardware management flag based on the identification of the different types of available at least one second hardware conversion functions;
   requesting image data conversion from an external device; and
   determining the memory size required for a number of available different types of at least one second hardware conversion functions based on said hardware management flag.

* * * * *